United States Patent [19]

Matthews et al.

[11] Patent Number: 4,610,844
[45] Date of Patent: Sep. 9, 1986

[54] METHOD OF MAKING A COEXTRUDATE OF MEAT AND FAT

[75] Inventors: Bernard T. Matthews, Norwich; David J. Joll, Holt; Habeeb M. Ziauddin; David N. Wilson, both of Norwich, all of England

[73] Assignee: Bernard Matthews plc, Norfolk, England

[21] Appl. No.: 694,760

[22] Filed: Jan. 25, 1985

[30] Foreign Application Priority Data

Feb. 3, 1984 [GB] United Kingdom ................. 8402948
Jan. 18, 1985 [GB] United Kingdom ................. 8501291

[51] Int. Cl.$^4$ .......................... A23L 1/317; A23P 1/12
[52] U.S. Cl. ..................................... 426/641; 426/413; 426/513; 426/516
[58] Field of Search ................... 426/90, 92, 105, 135, 426/138, 302, 641, 413, 513, 516; 17/35, 41; 138/118.1

[56] References Cited

U.S. PATENT DOCUMENTS

| 1,664,337 | 3/1928 | Vanderput . |
| 2,174,924 | 10/1939 | McCleary . |
| 2,307,413 | 1/1943 | Loux . |
| 2,527,493 | 10/1950 | Condon . |
| 2,551,463 | 5/1951 | Ramsbottom . |
| 2,568,491 | 9/1951 | Edwards . |
| 2,640,779 | 6/1953 | George . |
| 2,868,650 | 1/1959 | Hammerberg . |
| 2,956,886 | 10/1960 | Baush . |
| 3,399,423 | 9/1968 | Kielsmeier et al. . |
| 3,499,766 | 3/1970 | Vollink . |
| 3,502,234 | 3/1970 | Cook . |
| 3,530,531 | 9/1970 | Posegate . |
| 3,563,764 | 2/1971 | Posegate . |
| 3,688,518 | 9/1972 | Goltsos . |
| 3,698,916 | 10/1972 | Moreland . |
| 3,701,263 | 10/1972 | Barrett . |
| 3,752,618 | 8/1972 | Moreland . |
| 3,778,209 | 12/1972 | Wallace et al. . |
| 3,864,503 | 2/1975 | Steenolsen . |
| 3,881,029 | 4/1975 | Arenson . |
| 3,892,009 | 7/1975 | Townsend . |
| 3,911,154 | 10/1975 | Weatherspoon . |
| 3,959,503 | 5/1976 | Laugherty . |
| 4,207,046 | 6/1980 | Ayala et al. . |
| 4,207,347 | 6/1980 | D'Atri et al. . |
| 4,340,994 | 7/1982 | dos Santos et al. . |
| 4,407,830 | 10/1983 | Matthews et al. . |

FOREIGN PATENT DOCUMENTS

| 162649 | 6/1955 | Australia . |
| 4502 | 10/1979 | European Pat. Off. . |
| 0024790 | 3/1981 | European Pat. Off. . |
| 2304799 | 3/1973 | Fed. Rep. of Germany . |
| 444873 | 6/1912 | France . |
| 1193976 | 11/1959 | France . |
| 2165312 | 8/1973 | France . |
| 2221081 | 10/1974 | France . |
| 2227828 | 11/1974 | France . |
| 1452434 | 10/1916 | United Kingdom . |
| 2085275 | 4/1982 | United Kingdom . |

Primary Examiner—Arthur L. Corbin
Attorney, Agent, or Firm—Parkhurst & Oliff

[57] ABSTRACT

The product of the invention is a non-cylindrical coextrudate with a meat body and a fat coating. This product is extruded from a head partitioned into a meat discharging portion and a fat discharging portion each fed from a pump. Means are provided to maintain or return the product to the strict extruded shape.

10 Claims, 12 Drawing Figures

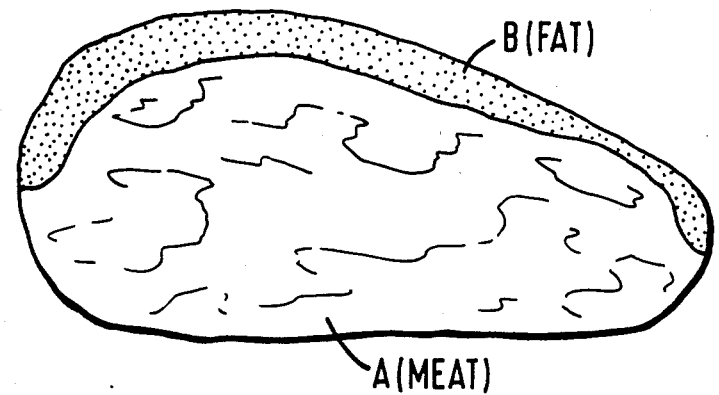
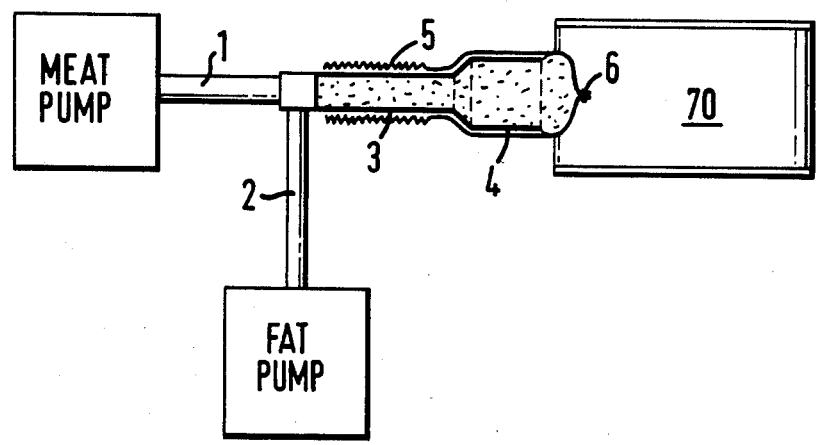

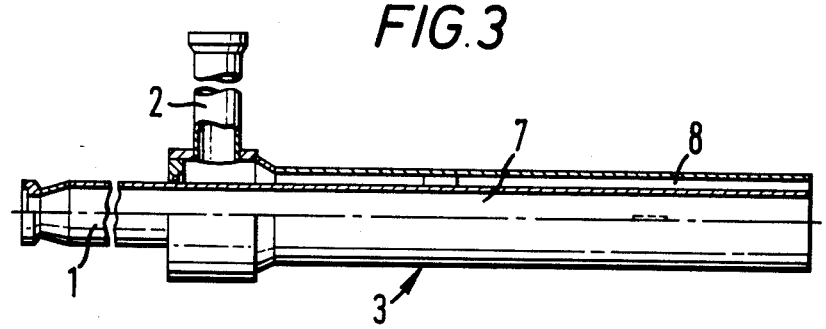
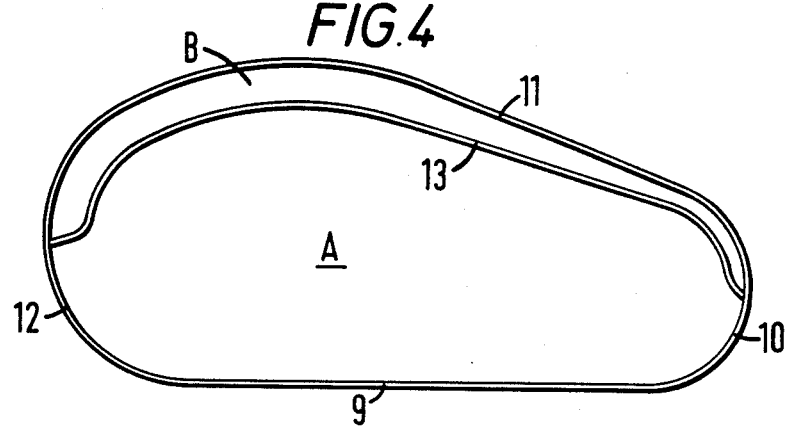
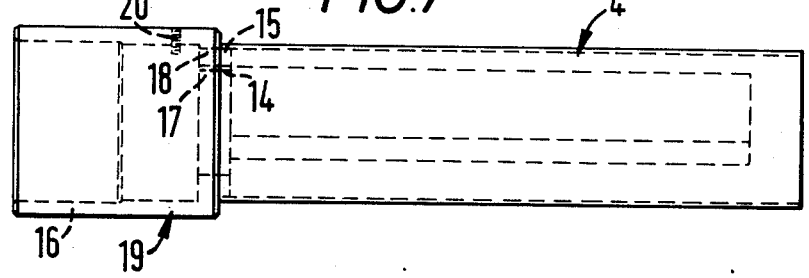

METHOD OF MAKING A COEXTRUDATE OF MEAT AND FAT

This invention relates to food products particularly meat-based products.

Our European Pat. No. 0,024,790B concerns the production of a product of constant circular cross section with a core of natural whole meat, i.e. muscle pieces, an outer annular layer of fat and a flexible plastics outer casing. The product is an integrated assembly of meat, fat and casing, the fat and casing remaining on the product during cooking and to the plate. Our European Pat. No. 0,024,790B provides a method and apparatus for producing this product by coextrusion of the meat core and the fat outer layer into a plastics sleeve constituting the fitting case.

The present invention sets out to provide a product having a constant cross-section body of meat, natural whole muscle, and an outer layer of fat. In the product of the present invention however, the main body or core does not have a circular cross-section but will have the configuration of a butcher's cut of meat, for example a generally flat base, rounded side portions and a gently curved and inclined upper surface. There will be an outer layer of fatty material at least on the upper curved surface; this layer will not normally extend completely around the piece though this is not precluded.

FIG. 1 of the accompanying drawings illustrates, approximately life-size, a typical meat product in accordance with the present invention. The product will be made, as will be described hereinafter, of constant cross section in continuous length and may be sliced to the approximate thickness of a steak or chop, say of the order of ½ inch, to be grilled or fried or in a length to simulate a boned butcher's roasting joint.

The configuration or profile illustrated is by way of example. The profile of a product in accordance with the invention is non-circular to simulate a "butcher's cut" and will usually have a generally flat base and a curved but assymetric upper part, with a height substantially less than the width.

The present invention primarily envisages a product wherein the meat is of natural whole muscle, either complete muscle or muscle cut into pieces of substantial size. Such products in every way simulate the taste and texture of natural meat with a fat coating. The method aspects of the present invention can however be applied to products wherein the meat body or core is of comminuted, advantageously flaked form. As will be apparent from the description hereinafter it is the products based on natural meat muscle which present production problems.

With regard to the fat it should be noted that the product in accordance with the present invention, in contrast to the cylindrical products of our earlier patents referred to above, are generally supplied to the consumer and thereafter cooked without an outer casing. It is important, therefore, that the fatty material should be so constituted as to preserve its integrity and colour and to bond with the meat, whole or comminuted, during cooking. A preferred formulation of fat which achieves this is an emulsified mixture of fat proper with lean meat pieces and salt, skin and other extenders. The proportion of real fat in this fat formulation may fall as low as 50%. Such an emulsified formulation is an effective simulation of the natural fat layer on meat and is capable of being retained by the meat body both before, during and after cooking. To enhance the bond between the meat body and the fat some adhesive meat emulsion can be added, either to the comminute or to the compact of whole muscle. The adhesive emulsion can be an emulsion of meat, water, polyphosphate and salt. The emulsification, moreover, releases the adhesive protein myosin. Where the lean meat body is a comminute the glue may be added before the flaking or comminuting process. In the case of a whole muscle compact myosin will already be liberated to some extent by massaging prior to extrusion (see our earlier Patent Specifications referred to above). The emulsifying process for the fatty formulation also liberates myosin to some extent so that both the fat layer and the meat body have adhesive properties, are compatible and therefore together on forming.

The invention will now be described by way of example and with reference to the accompanying drawings of which FIG. 1 has already been referred to. In the remainder:

FIG. 2 is a schematic diagram of a production line for carrying out the method of the invention;

FIG. 3 is a side view partly in section of the feed mandrel for the meat and fat in apparatus for the production line of FIG. 2;

FIG. 4 is a front view, on a different scale of an extrusion head for the mandrel of FIG. 3.

FIGS. 7 and 8 are side and end views respectively of the union of FIGS. 5 and 6 fixed to the head of FIG. 4;

Figure 5:
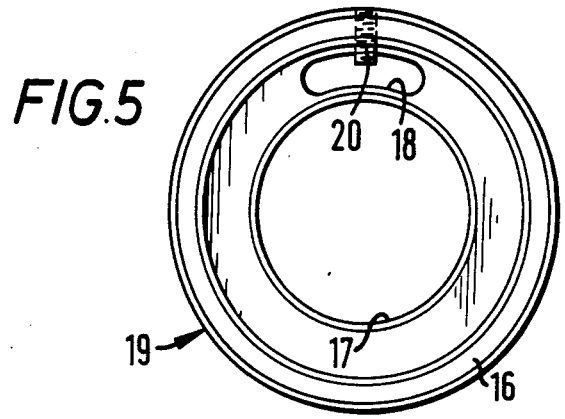
FIGS. 5 and 6 are end and section views respectively of a union to fix the head of FIG. 4 to the mandrel of FIG. 3.

Turning initially to FIG. 2 of the drawings a production line for carrying out the present invention comprises meat and fat pumps feeding meat and fat respectively through pipes 1 and 2, and a supply mandrel 3 with a coextrusion head 4. Casing stock 5, a sleeve of transparent flexible non-toxic plastics, is threaded over and stored on the mandrel. There is also provided though not illustrated a cutting, closing and clipping apparatus adjacent the extrusion head. This apparatus serves to cut the coextrudate, draw the plastic sleeve over the front face and clip and secure it at 6 as illustrated. If this procedure is carried out intermediate the ends of an elongate coextrudate both end faces produced by the cut are closed and clipped. Thus far the apparatus is that described and illustrated in our European Patent Specification No. 0,024,790 first published on Mar. 11, 1981.

The clipped and cased coextruded product of meat and fat is deposited on moving belt conveyor 70. FIG. 3 of the drawings shows mandrel 3 in more detail. Meat supply pipe 1 can be seen connecting with the central passage 7 of mandrel 3. Fat supply pipe 2 connects with the annular passage 8 surrounding passage 7. Thus when supplied from the pumps meat will flow down passage 7 and fat down surrounding annular passage 8 to arrive at extrusion head 4, characteristic of the present invention, which can be well seen in FIGS. 4 and 7.

Figure 6:
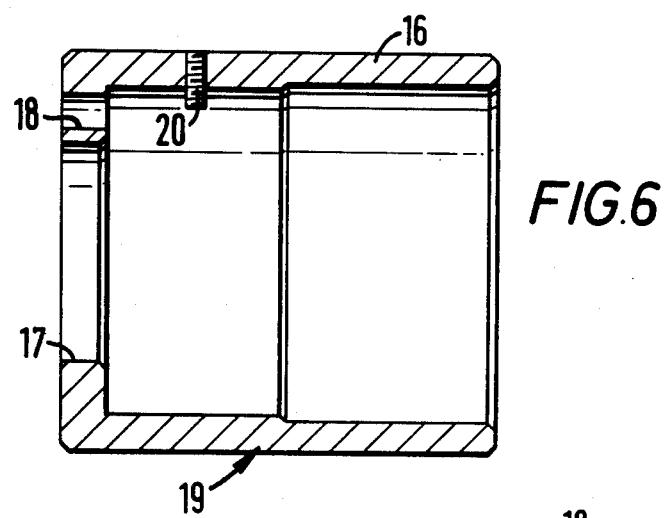
Figure 8:
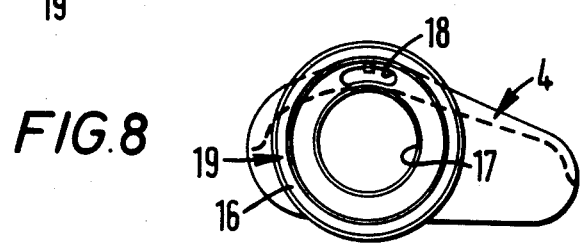

The head has a flat base 9, a shallow curved side part 10 from which the upper wall 11 rises upwardly to a gradual curve to the other and deeper side 12. The head is divided into a meat-discharging body part A and a fat discharging marginal part B by a partition 13 generally in the shape of the upper wall 11 with an approach to said wall towards the shallower side 10 thereby extruding a seemingly natural thinning of the fat coating. The back of the head has a circular hole 14 and a peripheral slot 15 for the inlet respectively of the meat and fat. FIGS. 5 and 6 illustrate a union 19 for connecting the head 4 to the mandrel 3. The union is a short cylindrical body portion 16 with an end wall with a circular socket 17 to register with the circular hole 14 in the back of the head and a peripheral circumferentially extending slot 18 to register with the slot 15 at the back of the head 4. The pipe defining passage 8 engages the socket 17 leaving an annular passage for the fat to emerge through the slot 15. The union is welded to the back of the head and a fixing screw 20 retains the mandrel pipes. Meat and fat under pressure can thus be fed into the extrusion head 4 to flow through parts A and B and to emerge as the shaped coextrudate of FIG. 1. The plastic sleeve 5 has approximately the same circumference as the head 4 and is thus a fit. As previously described with reference to FIG. 2 the coextrudate is cased by the sleeve 5.

Two separate modes of maintaining the coextruded shape will now be described by way of example. The first mode involves extruding the product in the energised or tight condition. Operating practice with the machine and method of our European Patent referred to previously has taught that an operator by holding on to the sleeve during extrusion to resist forward movement of the coextrudate can achieve the condition whereby the meat and fat tightly fill the sleeve with considerable residual energy particularly in the whole muscle-meat part. We will refer to this as a "tight fill". This residual energy has been thought to be advantageous in tending to maintain the coherence of the product by keying the lean to the fat. In such a condition with a non-cylindrical shape there is an immediate tendency on emergence from the head for the coextrudate to take up the cylindrical form. This tendency needs to be resisted.

Figure 9:
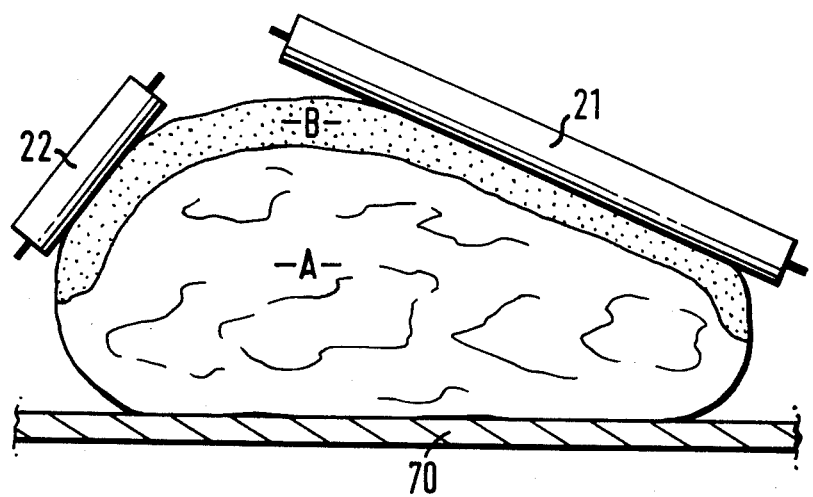
FIGS. 9 and 10 are schematic views constraining arrangements for maintaining the shape of a tightly filled product from the line of FIG. 2 and the head of FIG. 4.
Figure 10:
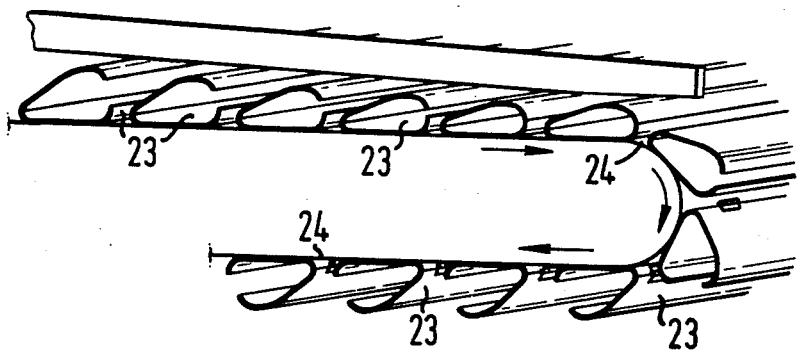

FIG. 9 of the drawings illustrates, in principle, one form of guide structure which can achieve this. The product A, B is resting and moving forwardly on the flat surface of the conveyor 70. A first roller 21 generally parallel to the long upper slope of the product impinges against that slope whilst a second roller 22 holds the deeper side of the product thereby preserving dimensional stability. Thus, held by a longitudinally extending array of similar roller pairs the coextrudate A, B advances through a freezing arrangement for example a tunnel nitrogen freezer. There is at least the surface is superficially hardened, case hardened, so that the product is dimensionally stable. The product can then be frozen hard in a freezing tank in the manner generally indicated in our European Patent already referred to. If necessary to achieve stability more rollers may be provided or ultimately a complete mold through which the initially unstable coextrudate passes and is frozen. To avoid an undesirable length of costly freezing tunnel another expedient in accordance with the invention is to "catch" lengths of extrudate in individual openable molds and have those molds moved laterally through a freezing tunnel. In the embodiment illustrated in FIG. 10 hinged openable mold casings 23 are filled with cased lengths or logs of coextrudate and then moved laterally by belt or equivalent 24 through a freezer. As the conveyor moves to a return run back to the extruder, the casings fall open to deposit the logs in a freezing tank.

When the elongate billets are cut to commercially desirable lengths much of the energy is released so that the products, be they relatively thin steak products or longer joint products, are dimensionally stable even when the casing is removed. The meat core has a certain tendency to expand in an irregular fashion when unfrozen and this results in an irregular and hence a more natural looking fat layer.

A further possibility is to allow the extrusion head to dispense into closed cavities or molds which are successively brought up to the extrusion head. When the cavity or mold is filled the coextrudate is sliced off.

With the above first mode process, however, certain disadvantages may arise, as on the one hand, meat can bulge out between the rollers or other guides and on the other hand "rolling-pin" type effects can occur wherein a roller produces ridges on either side of its length.

The second mode of achieving dimensional stability does not fill the sleeve so tightly with meat and fat and in particular the operator does not hold back the sleeve during extrusion in the manner set out above. We will refer to this as a "slack fill". There is thus only a minimal amount of residual energy in the extruded product and the tendency is thus for the product to sag to a symmetrical shape after a slack fill but we have found that this tendency can be reduced during superficial freezing provided that the speed of the conveyor is synchronised as closely as possible to the speed of extrusion. It should be appreciated that if the conveyor runs more rapidly than the speed of extrusion there is a tendency to attenuate the amount of filling whilst in the reverse situation with the conveyor moving more slowly there is some build up of material and in any situation where the conveyor speed and the extrusion speed are disparate there is a certain tendency for dragging effects and splitting of the casing.

Figure 11:
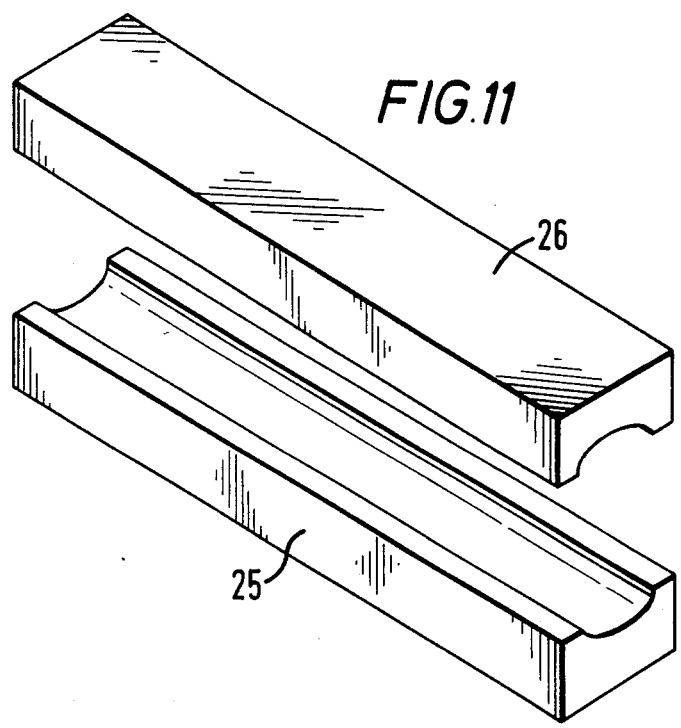
FIGS. 11 and 12 are schematic views in perspective and end respectively indicating moulding arrangements for a slackly filled product produced from the line of FIG. 2.
Figure 12:
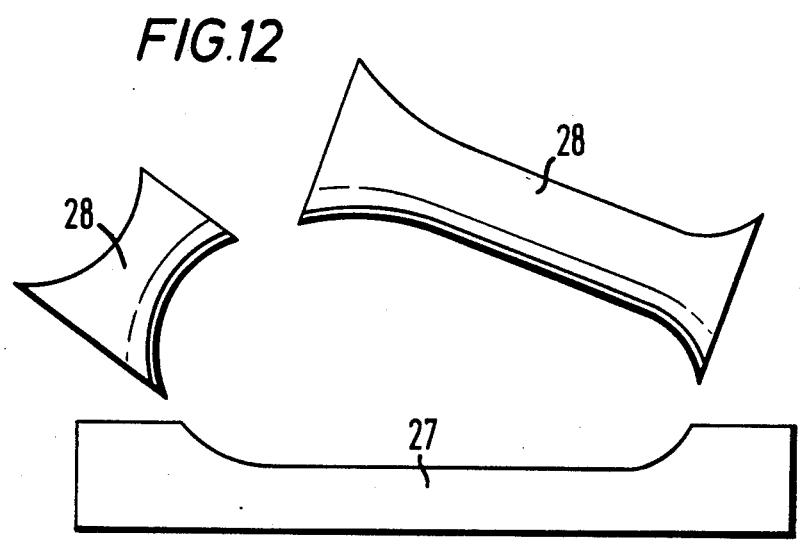

By appropriate synchronisation and slack filling an extruded product is achieved which holds an approximation to that shape determined by the head 4. The product is case hardened by superficial freezing as described above. The conveyor 70 then takes the product to one of the molds illustrated respectively in FIGS. 11 and 12. Referring initially to FIG. 11 a cased, closed and clipped extrudate or log is deposited in the bottom half 25 of a shaped mold after superficial or "case" hardening in a freezer. The top half 26 of the mold is then placed over the bottom half 25 and the superficial case hardening forms a stable outer layer which allows the product to be shaped to the exact required shape and to retain that shape. After this molding operation the extrudate is dimensionally stable and correctly shaped and can proceed to the final freezer. FIG. 12 works on a similar principle; a moving conveyor is provided at the base of a static lower part 27 of a mold. This moving base moves the cased extrudate past the shaping rollers 28 which are generally similar in form to those of FIG. 2 only with a slight concavity more accurately to impart the shape required. Slight variations in roller peripheral speed resulting from this concavity are acceptable in the context of a case-hardened product.

The processes of the present invention are primarily conceived for meats other than poultry meats. Beef, lamb and pork are particularly envisaged.

We claim:

1. A method of manufacturing a simulated natural cut of meat of substantially constant and non-cylindrical cross-section, said method comprising the steps of:
   co-extruding from respective regions of a non-cylindrical extrusion head an energised dimensionally unstable co-extrudate comprising a non-cylindrical energised body of whole-muscle meat bearing a layer of fat;
   encasing the co-extrudate emerging from the head with a fitting flexible sleeve closed across the front of the head to produce a tight fill of the sleeve with the co-extrudate;
   restraining the encased energised dimensionally unstable co-extrudable emerging from the head to preserve a shape imparted by the head by a longitudinally extending array of guides impinging against sides of the encased co-extrudate;
   superficially freezing the restrained co-extrudate to impart dimensional stability to it; and
   hard freezing the superficially frozen co-extrudate.

2. A method according to claim 1, wherein said cross-section is asymmetric.

3. A method according to claim 1, wherein said guides comprise rollers.

4. A method of manufacturing a simulated natural cut of meat of substantially constant and non-cylindrical cross-section, said method comprising the steps of:
   co-extruding from respective regions of a non-cylindrical extrusion head a co-extrudate comprising a non-cylindrical body of whole-muscle meat bearing a layer of fat;
   encasing the co-extrudate emerging from the head with a fitting flexible sleeve closed across the front of the head to produce a slack fill of the sleeve with the co-extrudate;
   delivering the encased co-extrudate onto a conveyor moving at a speed substantially synchronised to a speed of extrusion of the co-extrudate;
   superficially freezing the encased co-extrudate on the conveyor;
   molding the superifically encased frozen co-extrudate to a desired shape; and
   freezing the superficially frozen co-extrudate.

5. A method according to claim 4, wherein said superficially frozen encased co-extrudate is molded in a shaped mold.

6. A method according to claim 4, wherein said superficially frozen encased co-extrudate is molded by shaping rollers.

7. A method according to claim 4, wherein said cross-section is asymmetric.

8. A method of manufacturing a simulated natural cut of meat of substantially constant and non-cylindrical cross-section, said method comprising the steps of:
   co-extruding from respective regions of a non-cylindrical extrusion head an energised dimensionally unstable co-extrudate comprising a non-cylindrical energised body of whole-muscle meat bearing a layer of fat;
   encasing the co-extrudate emerging from the head with a fitting flexible sleeve closed across the front of the head to produce a tight fill of the sleeve with the co-extrudate;
   restraining the encased energised dimensionally unstable co-extrudate emerging from the head, to preserve a shape imparted by the head, by at least one mold;
   superficially freezing the restrained co-extrudate in said mold to impart dimensional stability to it; and
   hard freezing the superficially frozen co-extrudate.

9. A method according to claim 8, wherein said mold is a mold through which the encased co-extrudate passes as it is superficially frozen.

10. A method according to claim 8, wherein a series of individual openable molds catch lengths of the encased co-extrudate, and said lengths of co-extrudate are superfically frozen in said molds.

* * * * *